United States Patent [19]

Davis et al.

[11] Patent Number: 4,849,706

[45] Date of Patent: Jul. 18, 1989

[54] DIFFERENTIAL PHASE MODULATION DEMODULATOR

[75] Inventors: Gordon T. Davis; Baiju D. Mandalia, both of Boca Raton, Fla.

[73] Assignee: International Business Machines Corporation, Armonk, N.Y.

[21] Appl. No.: 214,250

[22] Filed: Jul. 1, 1988

[51] Int. Cl.$^4$ .................................... H04L 27/22
[52] U.S. Cl. .................... 329/112; 329/126; 329/145; 375/80; 375/85; 375/94
[58] Field of Search ............... 329/104, 105, 110, 112, 329/126, 137, 145; 375/80, 82, 83–87, 94; 455/214

[56] References Cited

U.S. PATENT DOCUMENTS

| | | | |
|---|---|---|---|
| 3,539,925 | 11/1970 | Seidel | 325/65 |
| 3,991,377 | 11/1976 | Salazar et al. | 329/104 X |
| 4,389,616 | 6/1983 | Gockler et al. | 329/104 |
| 4,416,016 | 11/1983 | Iapicco | 375/85 |
| 4,457,005 | 6/1984 | Burke et al. | 375/82 |
| 4,462,109 | 7/1984 | Hughes | 375/97 |
| 4,466,108 | 8/1984 | Rhodes | 375/83 |

OTHER PUBLICATIONS

IEEE Transactions on Comm. Vol. Comm 25, No. 2 02/77, Microprocessor Implementation of High-Speed Data Modems, pp. 238–250 by Piet J. Van Gerwen et al.

Telecommunications and the Computer, Second Edition by James Martin, Phase Modulation, pp. 224–228.

Primary Examiner—Siegfried H. Grimm

[57] ABSTRACT

A demodulator mechanism is described for demodulating differential phase modulated carrier signals. This demodulator mechanism solves the following two equations:

$$U = K[R2(R1-S1) + S2(R1+S1)]$$

$$V = K[R2(R1+S1) - S2(R1-S1)]$$

where U denotes a first baseband modulation component of the received carrier signal, V denotes a second baseband modulation component of the received carrier signal, K denotes a proportionality constant, R2 denotes the received carrier signal, R1 denotes a delayed version of the received carrier signal which has been delayed by one baud period relative to the received carrier signal, S2 denotes a 90° phase shifted version of the received carrier signal and S1 denotes a delayed version of the phase shifted carrier signal which has been delayed by one baud period relative to the phase shifted carrier signal. Both analog and digital implementations of the demodulator mechanism are described. Double frequency terms are automatically cancelled and no post detection filtering is required for this purpose.

15 Claims, 5 Drawing Sheets

| BIT 1 | BIT 2 | ΔØ | U | V |
|---|---|---|---|---|
| 1 | 1 | 0° | +1 | +1 |
| 0 | 1 | +90° | −1 | +1 |
| 1 | 0 | −90° | +1 | −1 |
| 0 | 0 | 180° | −1 | −1 |

DIFFERENTIAL PHASE MODULATION DEMODULATOR

TECHNICAL FIELD

This invention relates to demodulator mechanisms for demodulating phase modulated carrier signals. While not limited thereto, this invention is particularly useful in modem units of the type used for transmitting and receiving digital data via public communications networks such as telephone networks.

BACKGROUND ART

Various forms of phase modulation data transmission systems are presently known. In such systems, the phase of a carrier signal is varied in accordance with the coding of the data to be sent. The receiver unit which receives the transmitted signal, however, has no absolute sense of phase. It is, therefore, necessary either to use the signal itself in some way to generate information about the phases at the transmitting end of the system, or else to operate by examining the changes in phase that occur. The first approach needs a fixed reference signal at the receiver for identifying the reference phase used by the transmitter. A number of ingenious methods have been proposed for recovering the reference phase from the transmitted signal.

The second approach, which is referred to as a differential detection method, does not attempt to generate a fixed phase reference at the receiver. Instead, the data is coded by means of changes in the phase. The detector or demodulator at the receiver then merely looks for changes in phase from one interval to the next and does not need a phase reference signal. In this case, there is no need to have the coding start at any specific phase. If the phase of the carrier signal slips or drifts because of interference, the system will recover by itself. Thus, the differential detection method has definite advantages in terms of reduced equipment complexity.

A general description of phase modulation data transmission systems is given in the text book "Telecommunications And The Computer" (Second Edition), by James Martin, published by Prentice-Hall, Inc., 1976, at pages 224 -228 thereof.

Two basic methods have been heretofore proposed for demodulating a differential phase modulated carrier signal. One is a so-called coherent method (the same as is used for absolute phase encoded signals) and the other is a non-coherent method. In the coherent method, a carrier recovery circuit is used to reconstruct in-phase and quadrature-phase reference signals which are multiplied against the received signal and a phase shifted version of the received signal, with the results being linearly combined to produce a pair of demodulated signals representing the two modulation components of the received signal. The non-coherent demodulation method, on the other hand, does not use a carrier recovery circuit. Instead, a delayed version of the received signal is multiplied against the received signal to produce the demodulated signal.

The non-coherent demodulation method is usually simpler to implement since it does not require the carrier recovery circuit. In addition, the input filtering is less complex because a phase splitting filter is not required to generate the complex form of the received signal. The non-coherent method does, however, typically require a post detection filter in order to eliminate the double frequency terms generated by the multiplication process. Thus, each method has its advantages and disadvantages.

In digital implementations, wherein the demodulation functions are performed using digital number values obtained from a periodic sampling of the received signal, the coherent method appears to be the more attractive of the two because many of the calculations can be done at the symbol or baud rate, as opposed to the sampling rate. If a post detection filter is required, as is the case in the non-coherent method, the entire receiver must operate at the sampling rate in order to accurately filter out the double frequency terms generated by the demodulation process.

A typical coherent demodulator mechanism is described in a technical journal article entitled "Microprocessor Implementation Of High-Speed Data Modems", by P. J. Van Gerwen et al, appearing in the IEEE Transactions on Communications, Volume COM-25, Number 2, Feb. 1977, at pages 238 -250. Typical non-coherent demodulator mechanisms are described in the text book, "Digital and Analog Communication Systems", by K. S. Shanmugam, published by John Wiley & Sons, 1979.

SUMMARY OF INVENTION

This invention provides an improved demodulator or detector mechanism for demodulating a differential phase modulated carrier signal. This demodulator mechanism combines many of the advantages of both coherent and non-coherent demodulators. It has the structure of a typical coherent demodulator, but has no carrier recovery function, using instead an instantaneous estimate of the carrier signal. Hence, this demodulator may be called a "psuedo-coherent" demodulator. The carrier estimate is obtained directly from the received carrier signal with a delay of one baud between the calculation of the carrier estimate and its use in the demodulator. This results directly in a differential phase shift demodulated signal at the output of the demodulator. Since the demodulator structure is similar to that of a coherent demodulator, in the sense that double frequency terms are cancelled out, no post detection filtering is required.

Both analog and digital embodiments of the invention are described. In the digital embodiment, a sampling mechanism is provided for periodically sampling the input or received carrier signal and producing for each sample a multi-bit input carrier number representing the amplitude value of the input carrier signal at the moment of sampling. A storage mechanism is also provided for storing the input carrier numbers produced by the sampling mechanism. A microprocessor is provided for producing, from the stored input carrier numbers, phase shifted carrier numbers representing amplitude values of a phase shifted version of the input carrier signal. The microprocessor also operates to combine the input carrier numbers and the phase shifted carrier numbers for a first baud period with the input carrier numbers and the phase shifted carrier numbers for a second baud period for producing demodulated signal numbers representing amplitude values of a modulation component of the input carrier signal.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE ANALOG EMBODIMENT

Figure 1:
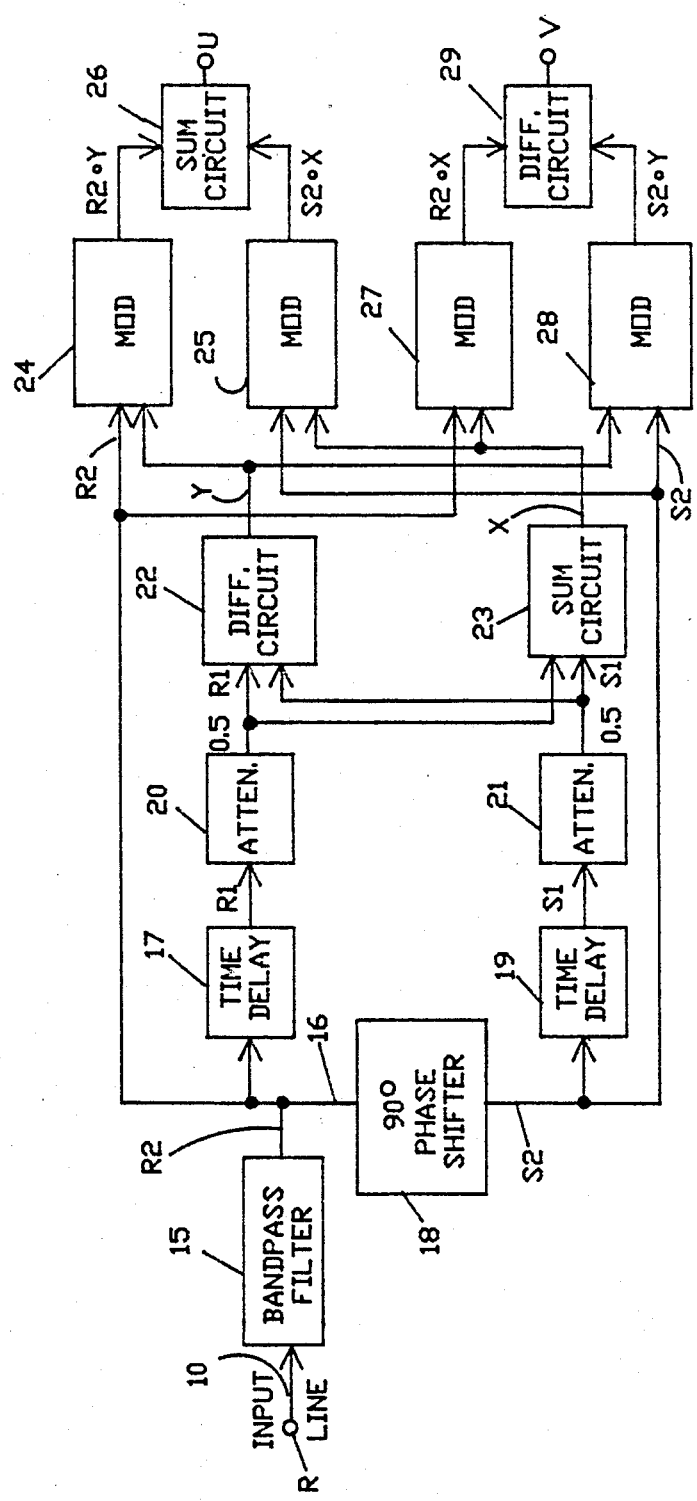
FIG. 1 is a circuit block diagram showing an analog embodiment of a demodulator mechanism constructed in accordance with the present invention.

Referring to FIG. 1, there is shown a representative analog embodiment of a demodulator mechanism constructed in accordance with the present invention for demodulating a differential phase modulated carrier signal. This demodulator mechanism includes input means represented by an input line 10 for supplying an input carrier signal R which is phase modulated. In the present embodiment, this carrier signal is a four-phase type signal, which means that at any given moment its phase angle may be any one of four different values.

The received carrier signal R is sinusoidal in nature and may be described by the mathematical relationship:

$$R = (A \cos \theta) + (B \sin \theta) = C \cos (\theta + \phi) \quad (1)$$

where:

$$\theta = 2\pi ft \quad (2)$$

The symbol "f" denotes the frequency of the carrier signal and "t" denotes time.

Figures 2, 3:
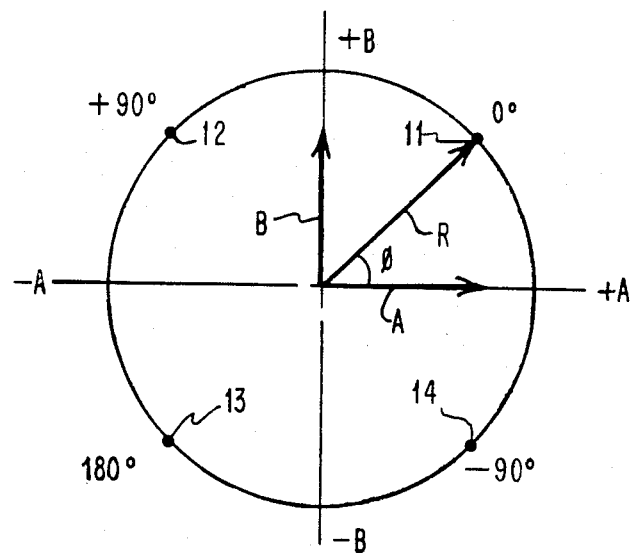
FIG. 2 is a vector diagram for the carrier signal used in the FIG. 1 embodiment.
FIG. 3 is a chart used in explaining the operation of the FIG. 1 embodiment.

FIG. 2 is a vector diagram for this input carrier signal R. The outer end of the vector R may be located at any one of the four points 11, 12, 13 and 14 at any given instant that $\theta$ is a multiple of $2\pi$. The peak magnitude "C" of vector R is represented by the length of the vector (radius of the circle) and the instantaneous amplitude of R is represented by its projection onto the real axis (horizontal axis). The angle "$\phi$" denotes the phase difference between the transmitted signal R and the reference signal $\cos \theta$.

The first part of Equation (1) describes the received carrier signal R in terms of its in-phase and quadrature-phase components. The in-phase component ($\cos \theta$) lies on the horizontal axis in FIG. 2 and has a peak amplitude value of "A" which is equal to either $-1$ or $-1$, depending on the value of the data being transmitted at that moment. The quadrature-phase component ($\sin \theta$) lies along the vertical axis in FIG. 2 and has a peak amplitude value of "B" which is equal to $-1$ or $-1$, depending on the coding of the data being transmitted. As seen in FIG. 2, the vector addition of the in-phase and quadrature-phase components produces the received carrier signal R.

In this four-phase type of system, the data bits to be transmitted are divided into or organized as pairs of bits (sometimes called "dibits") and one pair is transmitted during each transmission interval or baud period. The first bit in each data bit pair determines the amplitude value A of the in-phase component $\cos \theta$, while the second data bit in each pair determines the amplitude value B of the quadrature-phase component $\sin \theta$. Since each of the amplitude values A and B is binary in nature, having a value of either $-1$ of $-1$, there are four possible phase angles or phase values for the carrier signal R, these phase angles being for the four points 11, 12, 13 and 14 shown in FIG. 2. In effect, the first data bit in each dibit modulates the in-phase component and the second data bit of each dibit modulates the quadrature-phase component of the carrier signal R.

In a fixed reference type of phase modulation system, each of the four possible phase angles for the carrier signal R would represent a different two-bit binary value. The present embodiment, however, uses the differential phase modulation method. In this case, it is not the actual phase angle at any given moment which determines the two-bit binary value, but rather it is the change in phase angle from one transmission interval (baud period) to the next which determines the two-bit binary value. The chart of FIG. 3 shows the relationship between the two-bit binary values being transmitted and the resulting phase changes ($\Delta \phi$) which are used to represent such two-bit values. Thus, for example, if the carrier signal R has the same value in a second baud period as it had in the immediately preceding baud period (zero degree phase change), this represents a two-bit binary data value of "11". Similarly, a $+90°$ phase change from one baud period to the next represents a two-bit binary value of "01". Thus, the amount of the phase change from one baud period to the next determines the binary value of the two-bit pair.

The input carrier signal R (FIG. 1) is supplied by way of a bandpass filter 15 to a signal distribution line 16 which is connected to the output of filter 15. The signal on this distribution line 16 is designated as R2 and is identical to the carrier signal R except for any extraneous frequency components which were eliminated by the bandpass filter 15. The center frequency of the pass band for the filter 15 corresponds to the carrier frequency of the carrier signal R.

Figure 4:
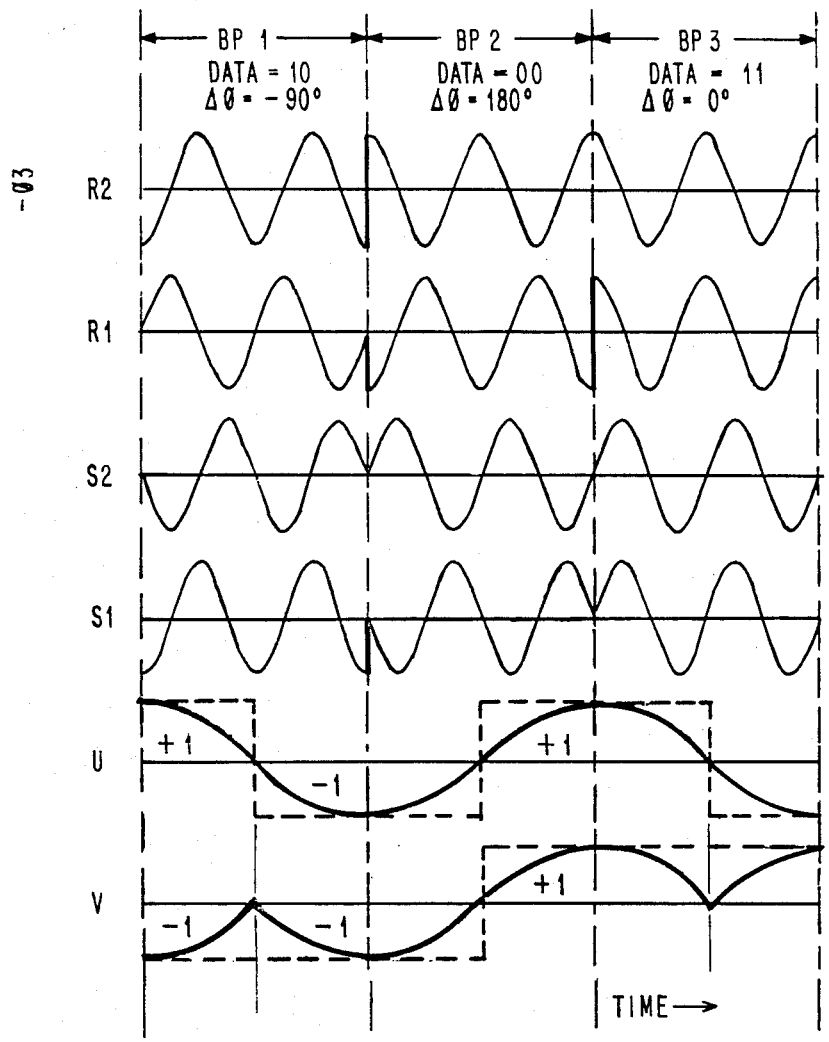
FIG. 4 is a timing diagram showing typical signal waveforms that may occur at different points in the FIG. 1 embodiment.

The upper waveform in FIG. 4 shows a representative signal pattern for the input carrier signal R2 over a time interval of three baud periods BP 1, BP 2, and BP 3. A "baud" is a unit of signaling speed and refers to the number of times the state or condition of a signal line may change per second. A baud period is the time interval during which the state or condition of the signal is required to remain the same. In the present embodiment, it is the time interval during which the phase of the carrier signal remains constant in order to provide a discrete phase signal. The carrier phase can be different in different baud periods, but must be the same within any given baud period. In other words, the baud period is the basic elemental signaling interval. As indicated in FIG. 4, the baud period corresponds to the period for two cycles of the carrier frequency for the present embodiment.

The demodulator mechanism of FIG. 1 also includes first delay means represented by a time delay circuit 17 which is responsive to the input carrier signal R2 for producing a delayed input carrier signal R1. The output signal R1 produced by the time delay circuit 17 is delayed by one baud period relative to the input signal R2 at the input of the time delay circuit 17. This delayed input carrier signal R1 is sinusoidal in nature and is represented by the second waveform in FIG. 4. It is identical to the R2 waveform except that it has been shifted to the right by one complete baud period relative to the R2 waveform. In other words, the R1 signal for the second baud period is identical to the R2 signal for the first baud period. The delayed signal is called R1 because, for any given baud period, it represents something that occurred earlier than the R2 signal for that given baud period.

The mathematical expression for the input carrier signal R2 is:

$$R2 = A2 \cdot \cos\theta + B2 \cdot \sin\theta \quad (3)$$

where A2 and B2 are the component peak amplitude values. The dot (·) symbol represents a multiplication sign. The mathematical expression for the delayed input carrier signal R1 is:

$$R1 = A1 \cdot \cos\theta + B1 \cdot \sin\theta \quad (4)$$

where A1 and B1 are the component peak amplitude values for the delayed signal.

The demodulator mechanism of FIG. 1 further includes phase shift means responsive to the input carrier signal R2 for producing a phase shifted carrier signal S2. This phase shift means is represented by a 90° phase shifter circuit 18. A typical signal pattern for the phase shifted carrier signal S2 is shown by the third waveform in FIG. 4. This S2 waveform is shifted by a factor of 90° relative to the input carrier signal R2. The mathematical expression for this phase shifted carrier signal S2 is:

$$S2 = A2 \cdot \sin\theta - B2 \cdot \cos\theta \quad (5)$$

The demodulator mechanism of FIG. 1 also includes second delay means responsive to the phase shifted carrier signal S2 for producing a delayed phase shifted carrier signal S1. This second delay means is represented by a time delay circuit 19. The output signal S1 is delayed by one baud period relative to the input signal S2. A representative pattern for the delayed phase shifted carrier signal S1 waveform is obtained by shifting the S2 waveform one complete baud period to the right. The mathematical expression for the delayed phase shifted carrier signal S1 is:

$$S1 = A1 \cdot \sin\theta - B1 \cdot \cos\theta \quad (6)$$

The demodulator mechanism of FIG. 1 also includes signal combining means jointly responsive to both the delayed input carrier signal R1 and the delayed phase shifted carrier signal S1 for producing at least one carrier reference signal. This signal combining means includes a first attenuation circuit 20 for reducing the amplitude of the delayed carrier signal R1 by a factor of one half and a second attenuator circuit 21 for reducing the amplitude of the delayed signal S1 by a factor of one half. This signal combining means also includes signal subtracting means which is responsive to the delayed input carrier signal 0.5 R1 and the delayed phase shifted carrier signal 0.5 S1 for producing a first carrier reference signal Y. This signal subtracting means is represented by a difference circuit 22 which operates to subtract the sinusoidal 0.5 S1 signal from the sinusoidal 0.5 R1 signal. The mathematical expression for the resulting carrier reference signal Y is:

$$Y = 0.5(R1 - S1) = M\cos\theta \quad (7)$$

This reference signal Y will sometimes be referred to herein as the cosine reference signal. This reference signal Y represents an instantaneous estimate of the cosine component (in-phase component) of the input carrier signal for the previous or immediately preceding baud period.

The signal combining means further includes signal adding means responsive to the delayed input carrier signal 0.5 R1 and the delayed phase shifted carrier signal 0.5 S1 for producing a second carrier reference signal X. This signal adding means is represented by a summing circuit 23 which operates to sum or add together the two sinusoidal signals 0.5 R1 and 0.5 S1 to produce the resulting second carrier reference signal X. The mathematical expression for this second carrier reference signal X is:

$$X = 0.5(R1 + S1) = N\sin\theta \quad (8)$$

This reference signal X will sometimes be referred to herein as the sine reference signal. It represents an instantaneous estimate of the sine component (quadrature component) of the received carrier signal during the previous or immediately preceding baud period.

The remainder of the circuit structure shown in FIG. 1 is similar to the coherent demodulator structure described in the above-referenced IEEE journal article by Van Gerwen et al, with the cosine and sine carrier estimates represented by the Y and X reference signals being used in place of the recovered carrier signals described by Van Gerwen et al.

The demodulator mechanism of FIG. 1 also includes first and second signal modulator means or mechanisms, each of which is responsive to the input carrier signal R2, the first carrier reference signal Y, the phase shifted carrier signal S2 and the second carrier reference signal X for respectively producing first and second demodulated signals U and V which respectively represent the in-phase and the quadrature-phase baseband components of the input carrier signal R.

The first of these signal modulator mechanisms includes a first modulator circuit 24 which is responsive to the input carrier signal R2 and the first carrier reference signal Y for producing a first product signal R2·Y. This first signal modulator mechanism also includes a second modulator circuit 25 which is responsive to the phase shifted carrier signal S2 and the second carrier reference signal X for producing a second product signal S2·X. This first signal modulator mechanism additionally includes a signal combining means responsive to the first and second product signals for producing the first demodulated signal U. This signal combining means is represented by a signal adding or signal summing circuit 26 which functions to add together the product signals produced by the modulator circuits 24 and 25.

The demodulated signal U is described by the mathematical expression:

$$U = R2 \cdot Y + S2 \cdot X \quad (9)$$

Substituting Equations (7) and (8) into Equation (9) gives:

$$U = 0.5 \cdot R2(R1 - S1) + 0.5 \cdot S2(R1 + S1) \quad (10)$$

This defines the demodulated signal U in terms of the sinusoidal signals R1, S1, R2 and S2. Substituting the expressions for R1, S1, R2 and S2 given in Equations (3) through (6) and simplifying gives the following description of the demodulated signal U:

$$U = 0.5\ (A1 \cdot A2 + A2 \cdot B1 - A1 \cdot B2 + B1 \cdot B2) \qquad (11)$$

This defines the demodulated signal U in terms of the peak amplitude values for the various sinusoidal signal components given in Equations (3) through (6). Each of these amplitude values A1, A2, B1 and B2 can have a value of either +1 or −1, depending on the coding of the data bits being transmitted.

The demodulated signal U represents the in-phase baseband component of the transmitted carrier signal. In the present example, this represents the binary value of the first data bit in each transmitted bit pair. A typical waveform segment for the demodulated signal U is represented by the fifth waveform in FIG. 4. The U values shown in FIG. 4 are for the corresponding phase angle values given above for the R1, S1, R2 and S2 sinusoidal signals shown in FIG. 4. Note that the value of U represents a change in phase from one baud period to the next, and not an absolute phase. Thus, several different combinations of R1, S1, R2 and S2 could result in the same U value as long as the phase difference between R1 and R2 remains the same from one case to the other.

The use of the two modulator circuits 24 and 25 and the summing circuit 26 serve to cancel out the double frequency terms generated by the multiplications which occur within the modulator circuits 24 and 25. In other words, the summing circuit 26 causes the double frequency terms appearing at the output of modulator circuit 24 to cancel out the double frequency terms appearing at the output of the modulator circuit 25. This enables the output signal U to contain only the baseband terms for the cosine component of the modulated carrier signal. Thus, no post detection filter is required to eliminate the double frequency terms.

The second signal modulator mechanism shown in FIG. 1 includes a first modulator circuit 27 which is responsive to the input carrier signal R2 and the second carrier reference signal X for producing a first product signal R2·X. The second signal modulator mechanism also includes a second modulator circuit 28 responsive to the phase shifted carrier signal S2 and the first carrier reference signal Y for producing a second product signal S2·Y. The second modulator mechanism further includes signal subtracting means represented by a difference circuit 29 for subtracting the first and second product signals to produce the demodulated signal V which represents the quadrature-phase baseband component of the transmitted carrier signal. The last waveform in FIG. 4 shows the waveform of the demodulated signal V for the particular phase angle values shown for the R1, R2, S1 and S2 sinusoidal signals in FIG. 4.

The demodulated signal V is described by the following mathematical expression:

$$V = R2 \cdot X - S2 \cdot Y \qquad (12)$$

Substituting Equations (7) and (8) into Equation (12) gives:

$$V = 0.5 \cdot R2(R1 + S1) - 0.5 \cdot S2(R1 - S1) \qquad (13)$$

Substituting the expressions for R1, S1, R2 and S2 given in Equations (3) through (6) and simplifying gives:

$$V = 0.5\ (A1 \cdot A2 - A2 \cdot B1 + A1 \cdot B2 + B1 \cdot B2) \qquad (14)$$

which describes the signal V in terms of the peak amplitude values of the sinusoidal signal components. Each of these amplitude values A1, A2, B1 and B2 can have a value of either +1 or −1, depending on the coding of the data bits being transmitted.

The two right-hand columns in the table of FIG. 3 show the various values of U and V for the different baud period to baud period phase change values shown in the $\Delta\phi$ column. The U value represents the binary value of the first bit in a transmitted bit pair and the V value represents the binary value of the second bit in the transmitted bit pair.

If the circuits shown in FIG. 1 had infinitely fast response times (which they don't), the U and V demodulated signal waveforms shown in FIG. 4 would be more rectangular in nature. Unfortunately, the actual finite response times for the abrupt changes which may occur at the baud period boundaries cause some rounding off and distortion of the demodulated signals. Nevertheless, sufficient information content remains to enable identification of the binary values being transmitted.

DESCRIPTION OF THE DIGITAL EMBODIMENT

Figure 5:
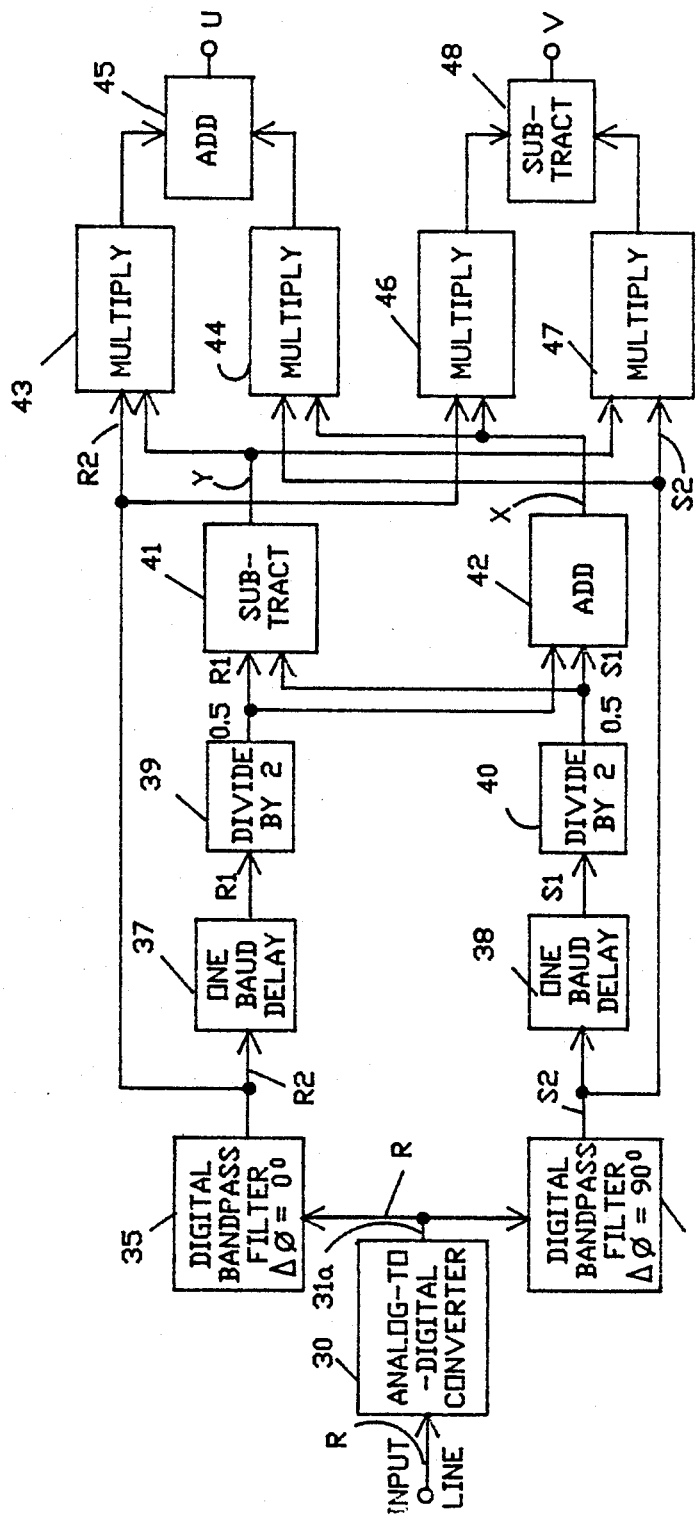
FIG. 5 is a block diagram showing the various functions of a digital embodiment of a demodulator mechanism constructed in accordance with the present invention.
Figure 6:
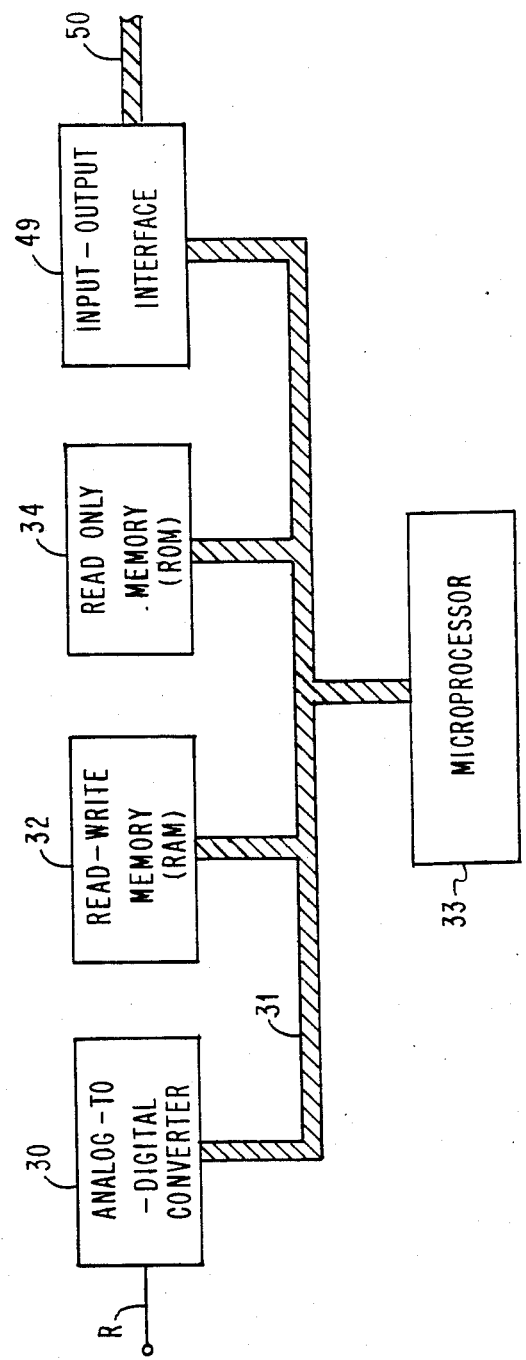
FIG. 6 is a block diagram showing a representative embodiment of microprocessor hardware which may be used to implement or execute the functions of the digital embodiment of FIG. 5.

FIG. 5 is a block diagram showing the various functions of a digital demodulator mechanism constructed in accordance with the present invention. FIG. 5 shows the different functions performed by the digital embodiment. These functions are generally the same as those performed by the analog embodiment of FIG. 1. FIG. 6 shows typical microprocessor hardware which may be used to perform the functions of FIG. 5.

The primary difference between the analog and digital embodiments is that the digital embodiment works with a series of multi-bit binary numbers, while the analog embodiment works with the continuous analog waveforms. To this end, the digital demodulator mechanism of FIG. 5 includes sampling means for periodically sampling the input carrier signal R and producing for each sample a multi-bit input carrier number representing the amplitude value of the input carrier signal R at the moment of sampling. This sampling means is represented by an analog-to-digital converter 30 which periodically converts the instantaneous amplitude value of the carrier signal R into a multi-bit binary number. As indicated in FIG. 6, the output of the analog-to-digital converter 30 is connected to a multi-conductor microprocessor bus 31. This bus 31 includes a multi-conductor data bus 31a (shown only in FIG. 5), a multi-conductor address bus 31b (not shown) and a multi-conductor control bus 31c (not shown). The multi-conductor data bus 31a is the only bus shown in FIG. 5 since FIG. 5 deals only with data values. Certain specialized Digital Signal Processing (DSP) microprocessors also have a separate instruction data bus and a separate instruction address bus to provide higher performance by permitting simultaneous access to both instructions and data.

There appears at the output of the analog-to-digital converter 30 a continuous stream of multi-bit binary numbers, with the bits in each number being placed on the multi-conductor data bus 31a in a parallel manner. The values of the numbers in this steady stream of numbers vary in the same manner as does the amplitude of the input phase modulated carrier signal R. Thus, the sequence of continuous analog values is replaced by a sequence of discrete digital number values representing the amplitude values at periodically spaced points on the analog waveform.

For sake of example only, it is assumed herein that the analog-to-digital converter 30 samples the input carrier waveform R at a rate of eight samples per carrier signal cycle. For a carrier frequency of 1200 Hertz, for example, this gives a sampling rate of 9600 samples per second.

The digital demodulator mechanism further includes storage means for storing the input carrier numbers produced by the sampling means 30. This storage means is represented in FIG. 6 by a random access read-write memory (RAM) 32 which is also coupled to the microprocessor bus 31. The input carrier numbers from converter 30 are stored at sequential storage locations in this read-write memory 32.

The digital demodulator mechanism also includes processor means for performing arithmetic and logical operations on multi-bit binary numbers. This processor means is represented in FIG. 6 by a microprocessor 33 which is coupled to the microprocessor bus 31. Among other things, microprocessor 33 controls the movement of the input carrier numbers from the analog-to-digital converter 30 to the read-write memory 32. A hardware multiplier (not shown) is typically added to this type of microprocessor to aid in the computation of DSP algorithms.

Various control program routines are provided for the microprocessor 33 for enabling it to carry out the different functions represented in FIG. 5. These control program routines are permanently stored in a random-access read only memory (ROM) 34 which is coupled to the microprocessor bus 31. A first of these control program routines provides the digital bandpass filter function indicated at 35 in FIG. 5. This digital bandpass filter 35 may, for example, be of the finite impulse response (FIR) type. In this case, the control program routine causes the microprocessor 33 to take a series of input carrier number values from the read-write memory 32, multiply each number value by an appropriate weighting coefficient and then combine or sum up all of the weighted values to produce a single "filtered" input carrier number for a particular sampling interval. This process is repeated for successive overlapping sets of input carrier numbers so as to produce a series of filtered carrier numbers corresponding to the different sampling intervals for the input carrier signal R. These filtered input carrier numbers are stored into the read-write memory 32 to provide the input carrier numbers R2 used by the subsequent FIG. 5 functions.

The digital demodulator mechanism further includes control means for causing the microprocessor 33 to produce from the stored input carrier numbers multi-bit phase shifted carrier numbers representing amplitude values of a phase shifted version of the input carrier signal R. This phase shifting control means is represented by a control program routine in the read only memory 34 which causes the microprocessor 33 to perform the function represented by a digital bandpass filter 36 in FIG. 5. The amount of phase shift produced is 90°. The digital bandpass filter 36 may be of the finite impulse response (FIR) type, in which case the procedure is the same as for the digital bandpass filter 35, except that the weighting coefficients are changed to provide a 90° phase shift for the filtered input carrier numbers. These filtered and phase shifted carrier numbers S2 are also stored in the read-write memory 32 for use by the subsequent functions shown in FIG. 5.

The important consideration for the filtered numbers R2 and S2 is that the S2 numbers correspond to a 90° phase shifted version of the R2 numbers. In other words, the absolute phase shift values for the filters 35 and 36 are not critical so long as the difference in phase shifts provided by filters 35 and 36 is equal to 90°.

The digital demodulator mechanism further includes control means for causing the microprocessor 33 to combine the input carrier numbers R1 and the phase shifted carrier numbers S1 for a first baud period with the input carrier numbers R2 and the phase shifted carrier numbers S2 for a second baud period for producing multi-bit demodulated signal numbers (either U or V) representing amplitude values of one of the modulation components of the input carrier signal R. For the U modulation component, this control means is represented by a control program routine in the read only memory 34 which causes the microprocessor 33 to combine the various numbers in accordance with the following mathematical relationship:

$$U = K[R2(R1-S1)+S2(R1+S1)] \quad (15)$$

where U denotes a demodulated signal number, K denotes a proportionality constant, R1 and S1 respectively denote the input carrier number and the phase shifted carrier number for a given sampling interval for a first baud period and R2 and S2 respectively denote the input carrier number and the phase shifted carrier number for the corresponding sampling interval in the next baud period. As seen from Equation (10) above, the proportionality constant K will normally have a value of 0.5.

When microprocessor 33 solves Equation (15), it uses the appropriate ones of the filtered input carrier number values and the filtered phase shifted carrier number values stored in the read-write memory 32. The one baud delay function 37 of FIG. 5 is accomplished because the R1 and R2 numbers are taken from the input carrier numbers for two adjacent baud periods. In a similar manner, the one baud delay function 38 for the S1 and S2 numbers is provided by taking these numbers from corresponding storage locations for two adjacent baud periods. In the present embodiment, the proportionality constant or scaling factor K of Equation (15) is provided by divide-by-two functions 39 and 40 of FIG. 5. In this case, the proportionality constant K is given a value of 0.5.

The signal subtracting function 41 of FIG. 5 corresponds to the (R1−S1) term in Equation (15) and the signal adding function 42 corresponds to the (R1+S1) term in equation (15). Signal multiplying function 43 provides the R2·(R1−S1) product term, while the signal multiplying function 44 provides the S2·(R1+S1) product term. The summing of the two product terms to produce the demodulated signal number U is represented by the signal adding function 45. Thus, when microprocessor 33 solves the relationship represented by Equation (15), it automatically performs the various functions represented by the functional units 37–45 of FIG. 5.

The digital demodulator mechanism further includes additional control means for causing the microprocessor 33 to combine the input carrier numbers R1 and the phase shifted carrier numbers S1 for a first baud period with the input carrier numbers R2 and the phase shifted carrier numbers S2 for a second baud period for producing multi-bit demodulated number signals V representing the amplitude values of a second modulation component of the input carrier signal R. This additional control means is represented by a control program routine in the read only memory 34 which causes the microprocessor 33 to combine the various number signals in accordance with the mathematical relationship:

$$V = K[R2(R1+S1) - S2(R1-S1)] \qquad (16)$$

where V denotes a demodulated signal number, K denotes a proportionality constant, R1 and S1 respectively denote the input carrier number and the phase shifted carrier number for a given sampling interval for a first baud period and R2 and S2 respectively denote the input carrier number and the phase shifted carrier number for the corresponding sampling interval in the next baud period. As before, the preferred value for the proportionality constant K is 0.5.

The term $K(R1+S1)$ is produced by the functions 37–40 and 42 of FIG. 5, this term being the item appearing at the output of the adding function 42. The term $K(R1-S1)$ is produced by the functions 37–41 and this quantity appears at the output of the signal subtracting function 41. Multiply function 46 produces at its output the term $K[R2(R1+S1)]$. The multiply function 47 produces at its output the term $K[S2(R1-S1)]$. Subtract function 48 subtracts the multiply 47 output from the multiply 46 output to produce the resulting demodulated signal number V. Thus, when the microprocessor 33 solves Equation (16), it automatically performs all of the various functions represented by functions 37–42 and 46–48 of FIG. 5.

The demodulated signal numbers U and V produced by solving Equations (15) and (16) represent the amplitude values of the two modulation components of the differential phase modulated carrier signal R. In a typical application, they will be stored into the read-write memory 32 for use in further signal processing operations such as slicing (threshold comparison), decoding, descrambling and deserializing. The deserializing operation takes the bit pairs which are received in a serial manner and rearranges them into 8-bit bit-parallel data bytes which are suitable for use by a host computer. An input-output interface unit 49 of FIG. 6 serves to transfer these 8-bit data bytes in a bit parallel manner to a host computer (not shown).

The demodulator mechanisms described herein do not require any post detection filtering for purposes of eliminating double frequency components. These double frequency components are automatically cancelled during the demodulation process.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A demodulator mechanism for demodulating a phase modulated carrier signal comprising:
    input means for supplying an input carrier signal which is phase modulated;
    phase shift means responsive to the input carrier signal for producing a phase shifted carrier signal;
    first delay means responsive to the input carrier signal for producing a delayed input carrier signal;
    second delay means responsive to the phase shifted carrier signal for producing a delayed phase shifted carrier signal;
    signal combining means jointly responsive to both the delayed input carrier signal and the delayed phase shifted carrier signal for producing a carrier reference signal;
    and signal modulator means jointly responsive to both the input carrier signal and the carrier reference signal for producing a demodulated signal representing a baseband modulation component of the input carrier signal.

2. A demodulator mechanism in accordance with claim 1 wherein the signals produced by the first and second delay means are delayed by one baud period relative to their respective input signals.

3. A demodulator mechanism for demodulating a phase modulated carrier signal comprising:
    input means for supplying an input carrier signal which is phase modulated;
    phase shift means responsive to the input carrier signal for producing a phase shifted carrier signal;
    first delay means responsive to the input carrier signal for producing a delayed input carrier signal;
    second delay means responsive to the phase shifted carrier signal for producing a delayed phase shifted carrier signal;
    signal subtracting means responsive to the delayed input carrier signal and the delayed phase shifted carrier signal for producing a first carrier reference signal;
    signal adding means responsive to the delayed input carrier signal and the delayed phase shifted carrier signal for producing a second carrier reference signal;
    and signal modulator means responsive to the input carrier signal, the first carrier reference signal, the phase shifted carrier signal and the second carrier reference signal for producing a demodulated baseband signal representing a baseband modulation component of the input carrier signal.

4. A demodulator mechanism in accordance with claim 3 wherein the signal modulator means includes:
    a first modulator responsive to the input carrier signal and one of the first and second carrier reference signals for producing a first product signal;
    a second modulator responsive to the phase shifted carrier signal and the other of the first and second carrier reference signals for producing a second product signal;
    and signal combining means responsive to the first and second product signals for producing the demodulated baseband signal.

5. A demodulator mechanism in accordance with claim 4 wherein;
    the first modulator is responsive to the input carrier signal and the first carrier reference signal;
    the second modulator is responsive to the phase shifted carrier signal and the second carrier reference signal;
    and the signal combining means is a signal adding means for adding the first and second product signals to produce the demodulated baseband signal.

6. A demodulator mechanism in accordance with claim 4 herein:
    the first modulator is responsive to the input carrier signal and the second carrier reference signal;

the second modulator is responsive to the phase shifted carrier signal and the first carrier reference signal;

and the signal combining means is a signal subtracting means for subtracting the first and second product signals to produce the demodulated baseband signal.

7. A demodulator mechanism in accordance with claim 3 and further including second signal modulator means responsive to the input carrier signal, the second carrier reference signal, the phase shifted carrier signal and the first carrier reference signal for producing a second demodulated baseband signal representing a second baseband modulation component of the input carrier signal.

8. A demodulator mechanism for demodulating a phase modulated carrier signal comprising:
   input means for supplying an input carrier signal which is phase modulated;
   phase shift means responsive to the input carrier signal for producing a phase shifted carrier signal;
   first delay means responsive to the input carrier signal for producing a delayed input carrier signal;
   second delay means responsive to the phase shifted carrier signal for producing a delayed phase shifted carrier signal;
   signal subtracting means responsive to the delayed input carrier signal and the delayed phase shifted carrier signal for producing a first carrier reference signal;
   signal adding means responsive to the delayed input carrier signal and the delayed phase shifted carrier signal for producing a second carrier reference signal;
   a first modulator responsive to the input carrier signal and the first carrier reference signal for producing a first product signal;
   a second modulator responsive to the phase shifted carrier signal and the second carrier reference signal for producing a second product signal;
   signal adding means responsive to the first and second product signals for producing a first demodulated signal representing a first baseband modulation component of the input carrier signal;
   a third modulator responsive to the input carrier signal and the second carrier reference signal for producing a third product signal;
   a fourth modulator responsive to the phase shifted input carrier signal and the first carrier reference signal for producing a fourth product signal;
   and signal subtracting means responsive to the third and fourth product signals for producing a second demodulated signal representing a second baseband modulation component of the input carrier signal.

9. A demodulator mechanism for demodulating a phase modulated carrier signal comprising:
   input means for supplying an input carrier signal which is phase modulated;
   sampling means for periodically sampling the input carrier signal and producing for each sample a multi-bit input carrier number representing the amplitude value of the input carrier signal at the moment of sampling;
   storage means for storing the input carrier numbers produced by the sampling means;
   processor means for performing arithmetic operations on multi-bit numbers;
   first control means for causing the processor means to produce from the stored input carrier numbers multi-bit phase shifted carrier numbers representing amplitude values of a phase shifted version of the input carrier signal;
   and second control means for causing the processor means to combine the input carrier numbers and the phase shifted carrier numbers for a first time interval with the input carrier numbers for a second time interval for producing multi-bit demodulated signal numbers representing amplitude values of a baseband modulation component of the input carrier signal.

10. A demodulator mechanism for demodulating a phase modulated carrier signal comprising:
    input means for supplying an input carrier signal which is phase modulated;
    sampling means for periodically sampling the input carrier signal and producing for each sample a multi-bit input carrier number representing the amplitude value of the input carrier signal at the moment of sampling;
    storage means for storing the input carrier numbers produced by the sampling means;
    processor means for performing arithmetic operations on multi-bit numbers;
    first control means for causing the processor means to produce from the stored input carrier numbers multi-bit phase shifted carrier numbers representing amplitude values of a phase shifted version of the input carrier signal;
    and second control means for causing the processor means to combine at least one of the input carrier numbers and at least one of the phase shifted carrier numbers for a first time interval with at least one of the input carrier numbers for a second time interval for producing at least one multi-bit demodulated signal number representing an amplitude value of a baseband modulation component of the input carrier signal.

11. A demodulator mechanism for demodulating a phase modulated carrier signal comprising:
    input means for supplying an input carrier signal which is phase modulated;
    sampling means for periodically sampling the input carrier signal and producing for each sample a multi-bit input carrier number representing the amplitude value of the input carrier signal at the moment of sampling;
    storage means for storing the input carrier numbers produced by the sampling means;
    processor means for performing arithmetic operations on multi-bit numbers;
    first control means for causing the processor means to produce from the stored input carrier numbers multi-bit phase shifted carrier numbers representing amplitude values of a phase shifted version of the input carrier signal;
    and second control means for causing the processor means to combine the input carrier numbers and the phase shifted carrier numbers for a first baud period with the input carrier numbers and the phase shifted carrier numbers for a second baud period for producing multi-bit demodulated baseband signal numbers representing amplitude values of a baseband modulation component of the input carrier signal.

12. A demodulator mechanism in accordance with claim 11 wherein the second control means causes the processor means to combine the various numbers in accordance with the following relationship:

$$U=K[R2(R1-S1)+S2(R1+S1)]$$

where U denotes a demodulated baseband signal number, K denotes a proportionality constant, R1 and S1 respectively denote the input carrier number and the phase shifted carrier number for a given sampling interval for a first baud period, and R2 and S2 respectively denote the input carrier number and the phase shifted carrier number for the corresponding sampling interval in the next baud period.

13. A demodulator mechanism in accordance with claim 11 wherein the second control means causes the processor means to combine the various numbers in accordance with the following relationship:

$$V=K[R2(R1+S1)-S2(R1-S1)]$$

where V denotes a demodulated baseband signal number, K denotes a proportionality constant, R1 and S1 respectively denote the input carrier number and the phase shifted carrier number for a given sampling interval for a first baud period, and R2 and S2 respectively denote the input carrier number and the phase shifted carrier number for the corresponding sampling interval in the next baud period.

14. A demodulator mechanism for demodulating a phase modulated carrier signal comprising:
   input means for supplying an input carrier signal which is phase modulated;
   sampling means for periodically sampling the input carrier signal and producing for each sample a multi-bit input carrier number representing the amplitude value of the input carrier signal at the moment of sampling;
   storage means for storing the input carrier numbers produced by the sampling means;
   processor means for performing arithmetic operations on multi-bit numbers,
   first control means for causing the processor means to produce from the stored input carrier numbers multi-bit phase shifted carrier numbers representing amplitude values of a phase shifted version of the input carrier signal;
   second control means for causing the processor means to combine the input carrier numbers and the phase shifted carrier numbers for a first baud period with the input carrier numbers and the phase shifted carrier numbers for a second baud period for producing first multi-bit demodulated signal numbers representing amplitude values of a first baseband modulation component of the input carrier signal;
   and third control means for causing the processor means to combine the input carrier numbers and the phase shifted carrier numbers for a first baud period with the input carrier numbers and the phase shifted carrier numbers for a second baud period for producing second multi-bit demodulated signal numbers representing amplitude values of a second baseband modulation component of the input carrier signal.

15. A demodulator mechanism in accordance with claim 14 wherein:
   the second control means causes the processor means to combine the various numbers in accordance with the following relationship:

$$U=K[R2(R1-S1)+S2(R1+S1)]$$

and the third control means causes the processor means to combine the various numbers in accordance with the following relationship:

$$V=K[R2(R1+S1)-S2(R1-S1)]$$

where U denotes a demodulated signal number for a first baseband modulation component of the input carrier signal, V denotes a demodulated signal number for a second baseband modulation component of the input carrier signal, K denotes a proportionality constant, R1 and S1 respectively denote the iput carrier number and the phase shifted carrier number for a given sampling interval for a first baud period, and R2 and S2 respectively denote the input carrier number and the phase shifted carrier number for the corresponding sampling interval in the next baud period.

* * * * *